United States Patent [19]

Coleman et al.

[11] 4,239,108
[45] Dec. 16, 1980

[54] VIDEO DISC CADDY

[75] Inventors: Clyde F. Coleman, Crawfordsville; Leslie A. Torrington, Indianapolis, both of Ind.

[73] Assignee: RCA Corporation, New York, N.Y.

[21] Appl. No.: 98,412

[22] Filed: Nov. 28, 1979

[51] Int. Cl.³ .................. G11B 25/04; B65D 85/30
[52] U.S. Cl. ............................. 206/312; 206/444; 274/9 B; 360/86; 360/133
[58] Field of Search ............ 274/9 B, 23 A; 360/86, 360/97, 98, 99, 131, 133; 358/128.5, 128.6; 206/444, 309, 312

[56] References Cited

U.S. PATENT DOCUMENTS

| 4,133,540 | 1/1979 | Torrington | 274/9 B |
| 4,159,827 | 7/1979 | Torrington | 274/9 B |
| 4,164,782 | 8/1979 | Stewart | 360/133 |

Primary Examiner—Steven L. Stephan
Attorney, Agent, or Firm—Eugene M. Whitacre; Joseph S. Tripoli; Dilip A. Kulkarni

[57] ABSTRACT

A record caddy, suitable for use with a video disc player, comprises a jacket and a record retaining spine removably located therein. Disposed on the spine are lateral latch fingers for releasably locking the spine to the jacket. The spine has a pair of slots into which a locating member disposed in the player is received to assure accurate location of the spine in the player. A pair of cutouts are disposed in the spine in which gripper members of the record extracting mechanism are received to lock the spine to the player so that the record/spine assembly is retained in the player during subsequent jacket withdrawal.

5 Claims, 9 Drawing Figures

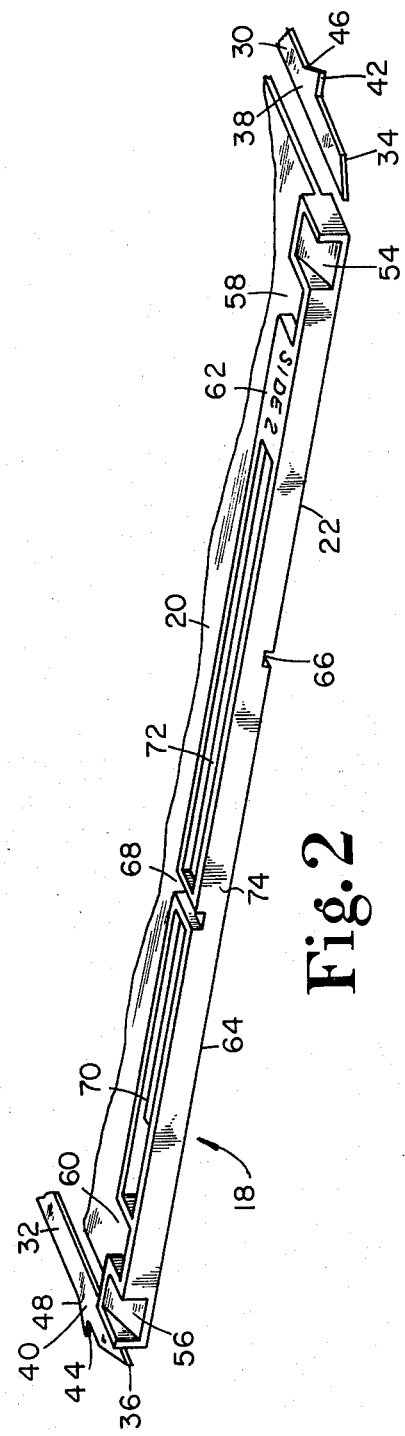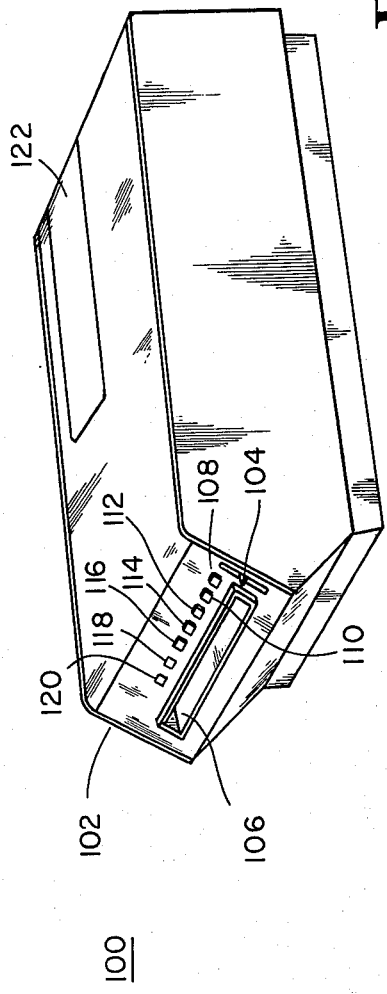

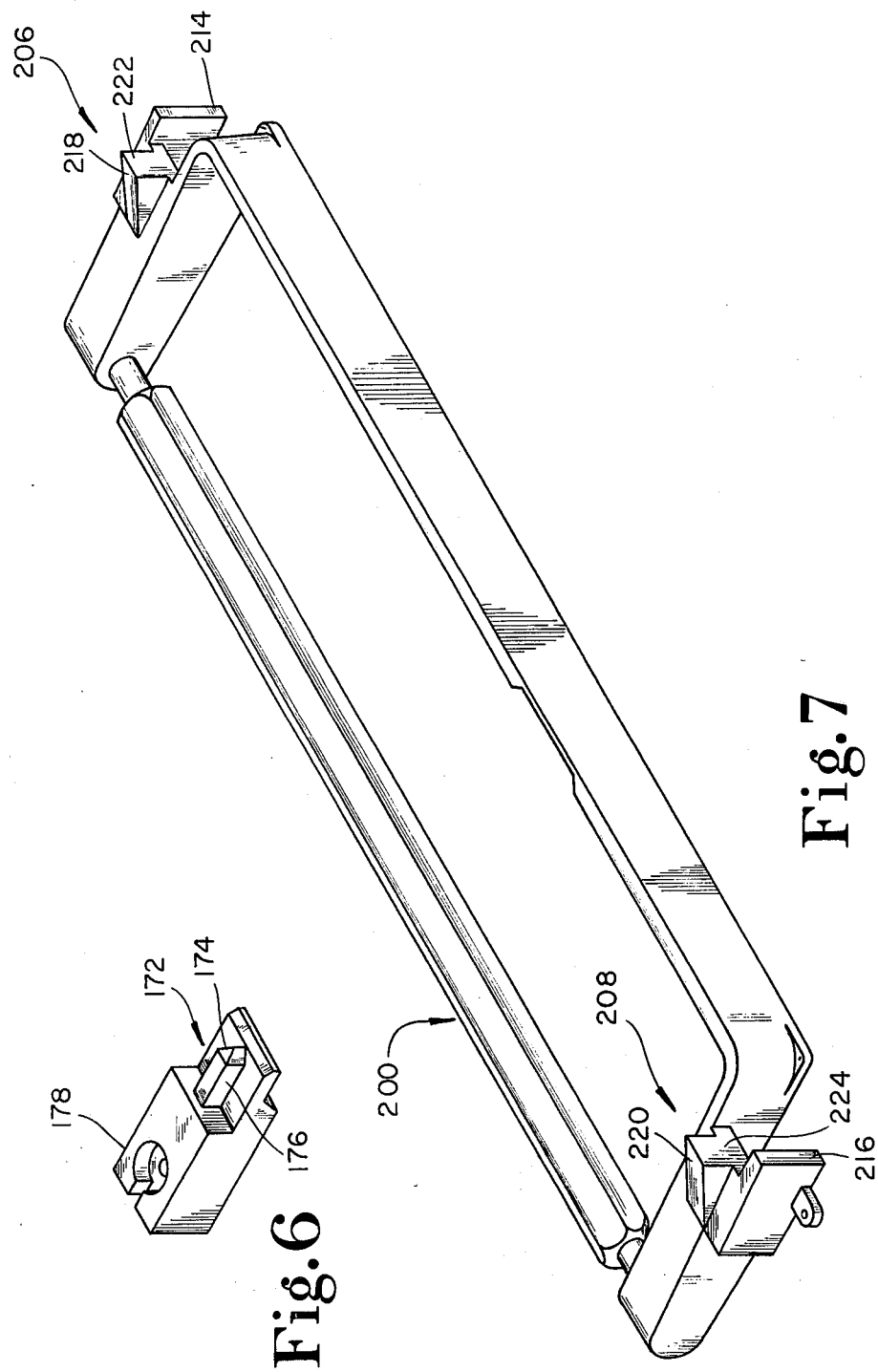

VIDEO DISC CADDY

This invention relates to a protective caddy for a video disc. More particularly, it relates to a video disc caddy suitable for use with player mechanisms which allow loading of a record into the player and its subsequent retrieval therefrom without having the user touch the record.

In certain video disc systems, information is stored on a disc record in the form of geometric variations in the bottom of a continuous spiral groove disposed on the record surface. The variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In such systems, it is beneficial to enclose the video disc record in a thin plastic caddy which comprises a jacket and a record retaining spine removably located therein in order to protect the record. The spine, in turn, consists of a closure portion and a further portion having an opening for receiving the enclosed record. For record loading, a full caddy is inserted into an input slot provided in the player. A record extracting mechanism disposed in the player removes the record and the spine assembly from the jacket during subsequent jacket withdrawal, whereby the record/spine assembly is retained in the player. The player is equipped with a receiving platform for supporting the retained record. The retained record is subsequently transferred to a turntable for playback by raising the turntable relative to the platform. For subsequent record retrieval, the record is transferred back to the platform by powering the turntable and an empty jacket is inserted into the player, whereby the record/spine assembly is returned back into the caddly. Withdrawal of the caddy from the player effects record retrieval. Reference is made to U.S. Pat. Nos. 4,159,827 and 4,133,540, issued to L. A. Torrington, for prior art examples of a video disc caddy and a record extracting mechanism suitable for use therewith.

In the above-mentioned type system, it is desirable to prevent an enclosed record from accidentally falling out of its protective caddy, and to deter indiscriminate access to the enclosed record. To this end, the record retaining spine is provided with a pair of integrally-molded flexural spine latch fingers carrying protruding elements which are seated in pockets disposed in the jacket when the spine is fully received therein, thereby locking the spine in place. When a fully caddy is inserted into the player for loading the enclosed record therein, the flexural spine latch fingers are deflected to allow separation of the spine from the jacket. Reference may be made to U.S. Pat. No. 4,164,782, filed in the name of Stewart, for an illustration of a caddy locking and unlocking mechanism.

It will be noted that in the operation of the Stewart-type caddy, spine latch fingers are subject to deflection in directions that are mutually opposite and at right angles to the major surface of the spine. It has been discovered that deflection of the spine latch fingers in opposite directions and at right angles to the major surface of the spine may subject the spine to undesirable bending forces.

In accordance with one aspect of this invention, the spine latch mechanism comprises a pair of latch members disposed on the spine for lateral motion parallel to the major surface of the spine. A protruding element is disposed on each of the spine latch members near the free end thereof. The jacket is provided with a pair of pockets for receiving the protruding elements when the spine is fully inserted into the jacket. Such configuration of the spine latch members overcomes the above-mentioned bending problem.

Another advantage of the subject spine latch mechanism is that the pockets in which the protruding elements of the latch fingers are received are disposed in the side edges rather than the top and bottom panels of the jacket as shown in the Stewart patent. Such configuration of the instant spine latch mechanism allows use of thinner main panels for the jacket.

In the caddy described in the Torrington and Stewart patents, the closure portion of the record retaining spine is provided with a cutout in the center which extends from the foremost edge of the closure portion toward the further portion of the spine. The jaw-like gripper members of the record extracting mechanism are received in the cutout during arrival of the caddy at the fully inserted position in the player for locking the spine to the player, whereby the spine and the associated record are retained in the player during subsequent jacket withdrawal. Such configuration of the gripper cutout weakens the spine and may cause misalignment of the spine in the player. Pursuant to a further feature of this invention, the spine is provided with a cutout near each end thereof for receiving the gripper members during insertion of the caddy into the player to lock the spine therein. The spaced gripper cutouts, in accordance with this invention, not only solve the rigidity problem, but also serve to accurately locate the spine in the front-to-back direction in the player. For a given discrepancy in the gripper and cutout locating surfaces, it will be seen that the degree of misalignment of the spine in the player is reduced when the distance between the gripper cutouts is increased.

For proper operation of the record transfer mechanism in the player, it is important to accurately position the record retaining spine laterally, in addition to the front-to-back alignment. In accordance with a still further aspect of this invention, the spine is provided with a pair of slots in which a locating member disposed in the player is received during caddy insertion to precisely locate the spine in the lateral direction in the player.

IN THE DRAWINGS:

FIG. 2 illustrates a partial perspective view of the record retaining spine of FIG. 1;

FIG. 3 represents a video disc player incorporating a record extracting mechanism suitable for use with the video disc caddy of FIGS. 1 and 2;

FIG. 6 is an inverted perspective view of a spine locating member disposed in the player of FIGS. 3–5;

FIGS. 7 and 8 illustrate the details of the record extracting mechanism of the player of FIGS. 3–5.

Figure 1:
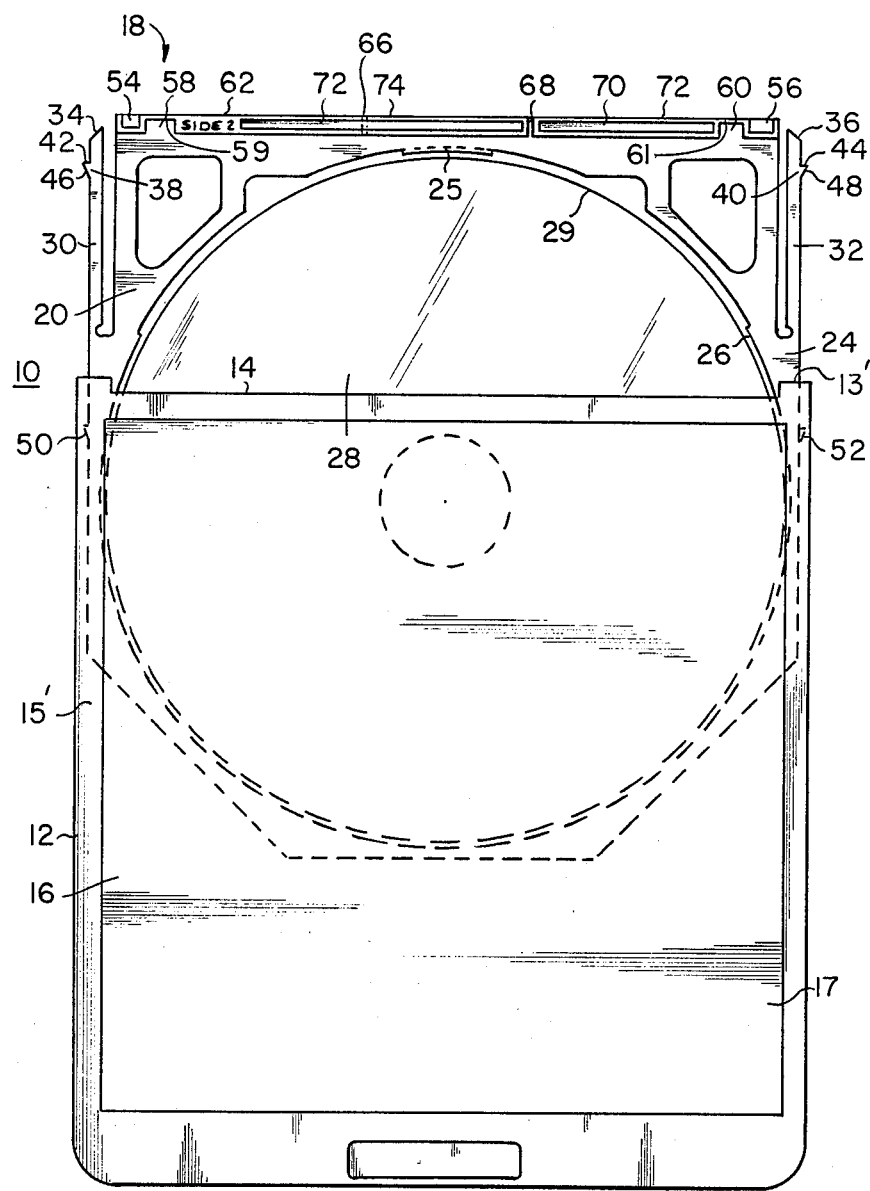
FIG. 1 shows a video disc caddy comprising a jacket and a record retaining spine in accordance with this invention.

As shown in FIG. 1, the video disc caddy 10 comprises a jacket 12 having an edge opening 14 in communication with a record enclosing cavity 16 and a substantially planar, record retaining spine 18 having a major surface 20, and subject to insertion into the jacket along a path. The record retaining spine 18 has a portion 22 which serves as a closure when the spine is fuly inserted into the jacket, and a portion 24 having a circular opening 26 for receiving a record 28. The spine 18 is further provided with a pair of integrally-molded, flexural latch fingers 30 and 32, which have free ends 34 and 36 adapted for lateral motion parallel to the major surface of the spine. Each of the spine latch fingers 30 and 32 has a protruding element 38 and 40. Each of the protruding elements 38 and 40 has a square edge 42 and 44, respectively, and an inclined edge 46 and 48, respectively. The protruding elements 38 and 40 are received in pockets 50 and 52 disposed in the jacket 12 for locking the spine 18 in place when it is fully inserted therein.

As shown in FIG. 2, the record retaining spine 18 is provided with a pair of player side identification ramps 54 and 56, a pair of gripper cutouts 58 and 60, a pair of caddy side identification pads 62 and 64 and a pair of spine locating slots 66 and 68. The details of these features will be later explained in conjunction with the description of the operation of the player. Additionally, recesses 70 and 72 are disposed on both sides of the foremost edge 74 of the spine 18 for providing a constant wall thickness in order to prevent occurance of post molding sink marks.

Disposed on the instrument panel 102 of the video disc player 100 is a function lever 104 as shown in FIG. 3. The function lever 104 is subject to disposition in any one of the three positions thereof—"OFF," "PLAY," and "LOAD/UNLOAD." A door flap, not shown, closes the caddy input slot 106 when the function lever 104 is disposed in the OFF and PLAY positions. In the LOAD/UNLOAD position of the function lever 104, the door flap is opened to permit, for example, insertion of a caddy through the input slot to load an enclosed record into the player. A pushbutton 108 is provided to dispose the player in the "PAUSE" mode. A set of pushbuttons 110, 112, 114 and 116 is arranged on the instrument panel 102 to dispose the player in any one of the four "SEARCH" modes, i.e., fast forward/reverse and scan forward/reverse. A digital readout 118 provides indication of playing time and other functions, such as, PAUSE, LOAD, END, etc. A pair of tally lights 120 are operated to provide indication of the record side subject to play, e.g., "SIDE 1" and "SIDE 2". An access door 122 is disposed on the cover of the player to provide access to a stylus cartridge.

Figure 4:
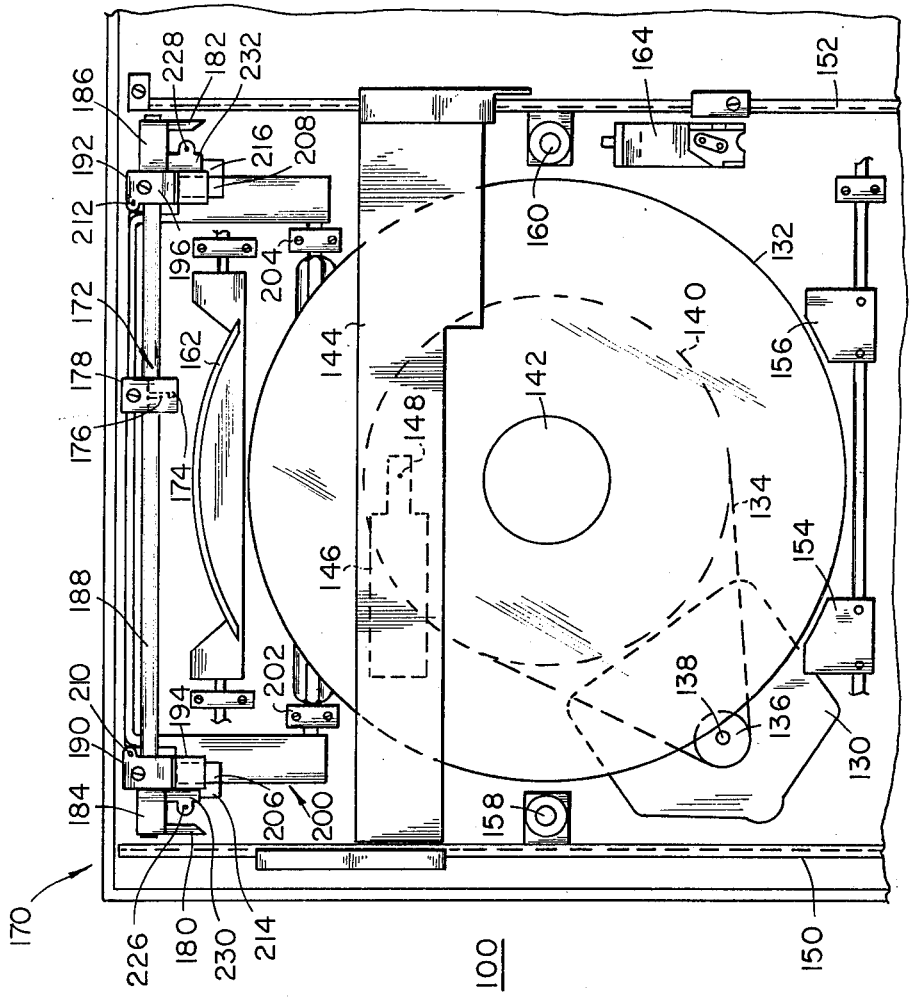
FIG. 4 is a partial plan view of the player of FIG. 3 with its cover removed.

As shown in FIG. 4, the player includes a motor 130 which drives a rotatably-mounted turntable 132 by means of a belt 134 disposed about a pulley 136 mounted on the motor shaft 138 and a flange 140 arranged on the underside of the turntable. A spindle 142 is disposed on the turntable 132 to center a record deposited thereon. A carriage 144, having a compartment for receiving the stylus cartridge 146, is subject to translation during playback from the back of the player toward the turntable spindle 142 in synchronism with the motion of a pickup stylus 148 riding in a spiral information groove disposed on the record.

The player is further equipped with a pair of rails 150 and 152, aligned with input slot 106, for guiding the caddy insertion into the player along a further path. A set of spring-loaded receiver pads 154, 156, 158, 160 and 162 are disposed in the player for supporting the spine and the record therein upon withdrawal of the jacket from the player such that the record/spine assembly is precisely aligned with the centerline of the guide rails 150 and 152.

The player further includes a record side identifying mechanism 164 whichs operates the SIDE 1/SIDE 2 tally lights 120 on the player instrument panel 102 to provide an indication of the record side subject to play. A concurrently-filed, commonly-assigned, copending application of L. Hughes, entitled "VIDEO DISC PLAYER HAVING RECORD SIDE IDENTIFYING APPARATUS," describes details of such record side identifying mechanism.

The player is further equipped with a record extracting mechanism 170 which will be described in detail first. To load a record into the player, the function lever 104 is disposed in the LOAD/UNLOAD position and a record-loaded caddy is inserted into the player along the guide rails 150 and 152. The caddy deflects the front receiver pads 154 and 156, the intermediate receiver pads 158 and 160, and the rear receiver pad 162 as it is inserted into the player. The record side identifier 164, in response to the absence or presence of the ramps 54 and 56 on the top side of the spine 18, activates the appropriate one of the tally lights 120, e.g., SIDE 1 or SIDE 2, respectively, during the caddy insertion. The caddy engages the carriage 144 as it is pushed into the player, thereby returning the carriage to the starting position at the back of the player.

A locating member 172, having a tapered lead-in portion 174 and a base portion 176, is disposed in the player for reception in the appropriate one of the slots 66 and 68 provided in the closure portion 22 of the spine 18 during arrival of the caddy at the fully inserted position in the player in order to accurately locate the spine in the lateral direction in the player. The spine locating member 172 is disposed on a retainer bracket 178 mounted in the player as shown in FIG. 6. Although, in the particular embodiment described herein, the lateral locating member 172 disposed in the player is offset relative to the caddy insertion path, the lateral locating member may be centrally disposed.

Figure 5:
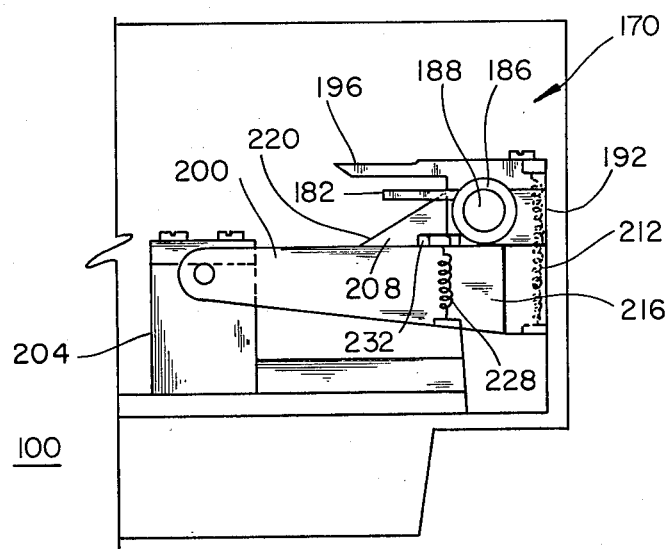
FIG. 5 depicts a partial side view of the player of FIGS. 3 and 4.

As the caddy reaches the fully inserted position in the player, the wedge-like portions of a pair of latch defeat members 180 and 182 enter the jacket to deflect the latch fingers 30 and 32 of the spine 18 to free the spine 18 and the enclosed record 28 from the jacket 12. The latch defeat members 180 and 182 are disposed on a pair of collars 184 and 186 which are fixedly mounted on a shaft 188. The shaft 188 is rotatably mounted in the player by means of a pair of pedestals 190 and 192. A pair of hold-down members 194 and 196 are disposed on the pedestals 190 and 192 to precisely locate the spine 18 in the vertical direction. The relative position of the hold-down member 196 is shown more clearly in FIG. 5.

A gripper arm 200 is pivotally mounted in the player by means of a pair of upstanding supports 202 and 204. Disposed on the gripper arm 200 are a pair of jaw-like gripper members 206 and 208 as shown in FIG. 7. The gripper arm 200 is biased toward the hold-down members 194 and 196 by a pair of coil springs 210 and 212 in the manner indicated in FIG. 5. A pair of ledge portions 214 and 216 disposed on the gripper arm 200 engage the underside of the collars 184 and 186 in order to accurately position the gripper members 206 and 208 and the latch defeat members 180 and 182 in the vertical direction.

As the caddy arrives at the fully inserted position in the player, the foremost edge of the caddy rides up the ramp portions 218 and 220 of the gripper members 206 and 208 to deflect the gripper arm downward until the coil springs 210 and 212 cause the gripper members to snap into the cutouts 58 and 60 disposed in the closure portion 22 of the spine 18 to lock the spine to the player. A pair of leaf springs (not shown) disposed in the player bias the spine such that the engagement between the locating surfaces 222 and 224 of the gripper members 206 and 208 and the locating surfaces 59 and 61 of the cutouts 58 and 60 is ensured. Since the spine 18 is released from the jacket 12 through the operation of the latch defeat members 180 and 182 and latched to the player through the operation of the spine gripper members 206 and 208, subsequent withdrawal of the jacket leaves the spine and the record assembly in the player. The spring loaded lift pads and hold-down members disposed in the player serve to accurately hold the retained spine/record assembly at the correct elevation in the player. The lateral registration of the spine/record assembly in the player is assured by the reception of the locating member 172 in the appropriate one of the cutouts 66 and 68 disposed in the spine 18. The engagement between the locating walls of the gripper members 206 and 208 and the cutouts 58 and 60 disposed in the spine 18 assure the front-to-back alignment of the spine/record assembly in the player.

Figure 8:
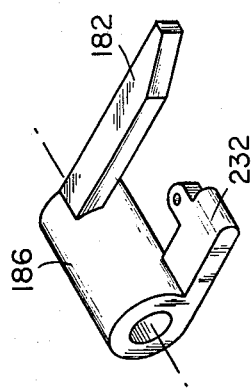

As soon as the latch defeat members 180 and 182 are freed from the jacket during caddy withdrawal, a pair of coil springs 226 and 228 disposed between the gripper arm 200 and the levers 230 and 232 arranged on the collars 184 and 186 cause downward deflection of the latch defeat members. The construction details of the collar 186 are shown in FIG. 8. The construction of the other collar 184 is similar.

To transfer the retained record to the turntable 132 for playback, the function lever 104 is moved to the PLAY position, which, in turn, raises the turntable and starts the turntable motor 130. The turntable 132 picks up the record as it is raised, leaving the spine 18 resting on the receiver pads 154, 156, 158, 160 and 162. The pickup stylus 148 is gently lowered into the spiral information groove on the record and the carriage 144 is translated toward the record center in correlation with the inward motion of the stylus. The recovered signal is processed to reconstruct a composite television signal containing picture and sound information.

To transfer the record back to the receiver pads 152–162, the function lever 104 is moved back to the LOAD/UNLOAD position, which lowers the turntable 132 to a height below the lift pads. To ensure that the recordd is properly returned into the record opening 26 disposed in the spine 18 as the turntable 132 is lowered, it is important to accurately locate the spine in the player—in the front-to-back, lateral and vertical directions. As previously indicated, the gripper members 206 and 208 assure the front-to-back alignment, the locating member 172 ensures lateral registration and the receiver pads 154–162 provide accurate vertical registration. To provide an indication of the degree of precision involved, consider the following illustrative dimension–record outside diameter=11.908±0.016 inches, spine opening diameter=11.985±0.015 inches. The caddy, in accordance with the present invention and operating with the described player mechanism, is capable of functioning with such small clearances.

Figure 9:
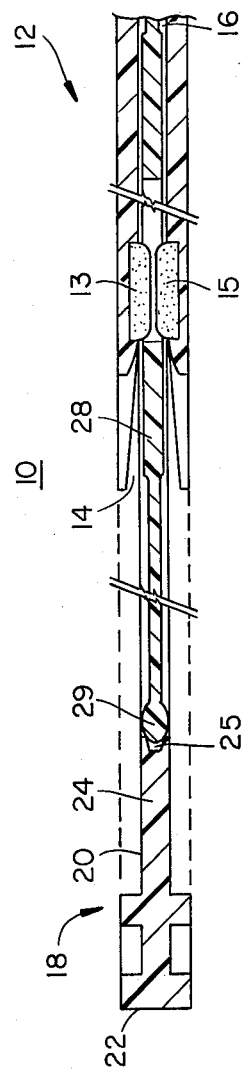
FIG. 9 shows the return of the record/spine assembly back into the jacket when an empty jacket is inserted into the player of FIGS. 3–5.

As shown in FIG. 9, the jacket 12 is provided with a pair of lip pads 13 and 15 to prevent dust and debris from entering into the record enclosing cavity 16 of the jacket and to wipe the dust and debris from the record 28 as it is inserted into the jacket and removed therefrom. Typically, the clearance between the lip pads is 0.020 inches and the record thickness is 0.076 inches. When the emptys jacket 12 is inserted into the player to retrieved the record/spine assembly, it thrusts the record 28 forward in the direction of insertion because of interference between the lip pads 13 and 15 and the record. Such forward thrust has tendency to cause the record 28 to slide over or under the spine 18, which, in turn, may cause the record to jam between the spine and the jacket 12. This condition especially happens if the plane of the disc is not precisely aligned with the plane of the spine 18 and the jacket 12. To prevent such jams, the peripheral wall of the spine 18 defining the record opening 26 is provided with a pocket 25 in which the record bend 29 is trapped when the record is thrust forward during the jacket insertion. Such configuration of the spine is the subject matter of a concurrently-filed, commonly-assigned, copending application of L. A. Torrington and entitled "VIDEO DISC CADDY HAVING DISC ENTRAPMENT".

To retrieve the record from the player, an empty jacket 12 is inserted into the player through the input sot 106 along the guide rails 150 and 152.

As the jacket 12 arrives at the fully inserted position of the player, the front ege thereof engages the deflected latch defeat members 180 and 182 to cause further downward deflection thereof. During such further downward deflection, the levers 230 and 232 disposed on the collars 184 and 186 bear upon the ledge positions 214 and 216 disposed on the gripper arm 200 to effect downward displacement thereof, whereby the spine 18 is released from the gripper arm. When the jacket 12 is fully inserted into the player, the spine latch fingers 30 and 32 snap back into the recesses 50 and 52 to lock the spine 18 to the jacket and the record/spine assembly is thus retrieved when the jacket is withdrawn.

What is claimed is:

1. A protective caddy for a disc record for use with a record player; said player having an input slot through which said caddy is inserted along a path to load an enclosed record therein; said player being provided with a spine locating member, a pair of latch defeat members and a pair of spine gripper members at the end thereof remote from said input slot; said caddy comprising:

(A) a jacket having an edge opening in communication with a record enclosing cavity; and (B) a substantially planar, record retaining spine having a major surface and subject to insertion into said jacket along a further path; said spine defining a first portion forming a closure for said edge opening, and a further portion for restraining planar movement of an enclosed record relative to said spine;

said closure portion of said spine having a slot for receiving said locating member disposed in said player during arrival of said caddy at a fully inserted position in said player to locate said spine therein in the lateral direction;

said spine being provided with a pair of latch members for releasably securing said spine to said jacket; each of said spine latch members having a free end subject to deflection along a direction substantially parallel to said major surface and perpendicular to said spine insertion path; each of said spine latch members having a protuberant element disposed near the free end thereof; each of said protuberant elements having a slanting surface remote from said free end of the respective one of said spine latch members, each of said slanting surfaces extending substantially perpendicularly to said major surface and non-perpendicularly to said spine insertion path such that engagement between said slanting surface and a portion of said jacket near said edge opening causes deflection of said spine latch member to allow insertion of said spine into said jacket; each of said protuberant elements having a square surface adjacent to said free end of the respective one of said spine latch members, and extending substantially perpendicularly to both said major surface and said spine insertion path;

said jacket being provided with a pair of pockets for receiving said protuberant elements disposed on said spine latch members when said spine is fully seated in said jacket; each of said pockets defining a surface adjacent to said edge opening of said jacket, each of said defined surfaces being disposed substantially perpendicularly to said spine insertion path; said perpendicularly disposed surfaces of said pockets being subject to engagement with said square surfaces of said protuberant elements upon reception of the respective one of said protuberant elements into the respective one of said pockets to preclude removal of said spine from said jacket during said engagement;

said free end of each of said spine latch members being arranged for arrival in the path of the respective one of said latch defeat members mounted in said player during insertion of said caddy into said player for effecting deflection of said spine latch members in a manner retracting said protruding elements from said pockets for freeing said spine from said jacket;

said closure portion of said spine defining a pair of cutouts for receiving said gripper members disposed in said player in response to arrival of said caddy at said fully inserted position in said player to lock said spine to said player such that said spine having been freed from said jacket is removed therefrom, along with said enclosed record, for retention in said player during subsequent jacket withdrawal.

2. The caddy as defined in claim 1 for use with said player wherein said locating member disposed therein has a tapered lead-in portion and a base portion having a given width in said lateral direction; wherein the dimension of said slot in said lateral direction is substantially constant throughout its operating range and is substantially equal to said given width.

3. The caddy as defined in claim 2 for use with said player wherein said locating member disposed therein is laterally offset relative to said caddy insertion path; wherein said closure portion of said spine has a pair of slots for receiving said locating member; the position of said slots being such that said locating member is received in the slot which is disposed on the same side of said caddy insertion path as said locating member.

4. The caddy as defined in claim 1 wherein said cutouts are formed such that access thereto is permitted only in a direction substantially perpendicular to said major surface of said spine.

5. The caddy as defined in claim 4 wherein the foremost edge of said closure portion is disposed substantially orthogonal to said spine insertion path, and serves to preclude access to said cutouts in directions other than said direction substantially perpendicular to said major surface of said spine.

* * * * *

UNITED STATES PATENT AND TRADEMARK OFFICE
CERTIFICATE OF CORRECTION

PATENT NO. : 4,239,108

DATED : December 16, 1980

INVENTOR(S) : Clyde F. Coleman et al.

It is certified that error appears in the above-identified patent and that said Letters Patent is hereby corrected as shown below:

Column 1, line 35 "powering" should be --lowering--.

Column 1, line 38 "caddly" should be --caddy--.

Column 1, line 52 "fully" should be --full--.

Column 5, line 56 "recordd" should be --record--.

Column 6, line 22 "bend" should be --bead--.

Column 6, line 32 "ege" should be --edge--.

Signed and Sealed this

Third Day of March 1981

[SEAL]

Attest:

RENE D. TEGTMEYER

Attesting Officer

Acting Commissioner of Patents and Trademarks